US010453354B2

(12) United States Patent
Chen et al.

(10) Patent No.: US 10,453,354 B2
(45) Date of Patent: Oct. 22, 2019

(54) AUTOMATICALLY GENERATED FLASH CARDS

(71) Applicant: COURSERA, INC., Mountain View, CA (US)

(72) Inventors: Zhenghao Chen, Palo Alto, CA (US); Jiquan Ngiam, Mountain View, CA (US); Daphne Koller, Portola Valley, CA (US)

(73) Assignee: COURSERA, INC., Mountain View, CA (US)

( * ) Notice: Subject to any disclaimer, the term of this patent is extended or adjusted under 35 U.S.C. 154(b) by 149 days.

(21) Appl. No.: 15/392,386

(22) Filed: Dec. 28, 2016

(65) Prior Publication Data

US 2018/0182255 A1 Jun. 28, 2018

(51) Int. Cl.
*G09B 7/02* (2006.01)
*G09B 5/06* (2006.01)
*G06F 17/27* (2006.01)

(52) U.S. Cl.
CPC .............. *G09B 7/02* (2013.01); *G09B 5/065* (2013.01); *G06F 17/2775* (2013.01)

(58) Field of Classification Search
CPC ....... G09B 7/02; G06F 17/21; G06F 17/2765; G06F 17/2785
USPC .................................................. 434/32, 362
See application file for complete search history.

(56) References Cited

U.S. PATENT DOCUMENTS

| 2003/0204396 | A1* | 10/2003 | Wakita | G10L 15/19 704/231 |
| 2004/0153509 | A1* | 8/2004 | Alcorn | G06Q 30/06 709/205 |
| 2005/0137723 | A1* | 6/2005 | Liu | G09B 7/00 700/45 |
| 2007/0190512 | A1* | 8/2007 | Meimer | G09B 5/00 434/322 |
| 2009/0075247 | A1* | 3/2009 | Tucci | G09B 7/02 434/362 |
| 2009/0077479 | A1* | 3/2009 | Tucci | G09B 5/02 715/764 |
| 2011/0123974 | A1* | 5/2011 | Steinglass | H02H 7/1206 434/362 |
| 2011/0257961 | A1* | 10/2011 | Tinkler | G09B 7/06 704/9 |

(Continued)

*Primary Examiner* — David L Lewis
*Assistant Examiner* — Shauna-Kay Hall
(74) *Attorney, Agent, or Firm* — Brake Hughes Bellermann LLP (57) ABSTRACT

Techniques for generating an assessment question about content of an educational course include obtaining, by processing circuitry of a computer, an electronic document of content of the course and generating a parsable text version of the electronic document. Importance scores for sentences of the parsable text version of the electronic document are generated and a sentence having an importance score that exceeds a first threshold value is identified. A key phrase in the identified sentence is identified, where the identified key phrase has a key phrase score that exceeds a second threshold value, and an assessment question about the content of the course related to the identified sentence is generated, where the assessment question is based on the identified sentence but where the identified key phrase is not present in the assessment question.

20 Claims, 6 Drawing Sheets

(56) References Cited

U.S. PATENT DOCUMENTS

| | | | | |
|---|---|---|---|---|
| 2013/0144981 A1* | 6/2013 | Koreeda | G06Q 10/00 | 709/219 |
| 2013/0149681 A1* | 6/2013 | Tinkler | G09B 7/04 | 434/167 |
| 2013/0266922 A1* | 10/2013 | Needham | G09B 7/00 | 434/350 |
| 2013/0311409 A1* | 11/2013 | Ye | G06N 99/005 | 706/12 |
| 2014/0134576 A1* | 5/2014 | Edge | G09B 19/04 | 434/157 |
| 2015/0095770 A1* | 4/2015 | Mani | G06F 17/2745 | 715/254 |
| 2016/0133148 A1* | 5/2016 | Hanks | G09B 7/06 | 434/309 |

* cited by examiner

High Performance Collaboration:
Leadership, Teamwork, and Negotiation

Welcome & Specialization Information

Organizations have always been the drivers of progress and productivity. In business, when an entrepreneur has a really good idea, ...

On leadership, it's other people, not your title that determines whether you're a leader. High impact leaders both motivate and inspire peo...

So, great leadership is all about motivating and inspiring other people to bold and effective action. To do that, there are two things y...

Leadership requires two core skills: problem solving and imagining the future. Both can be addressed through the process of design i...

Design innovation empowers leaders to develop meaningful solutions, create value, and envision new possibilities. At the very hi...

Your story, how you connect with internal and external groups, can be a key to the success of your organization. Great brands, like great jou...

If you know what your real communication task is, naturally you can make better

AUTOMATICALLY GENERATED FLASH CARDS

TECHNICAL FIELD

This description relates to generating assessment materials for educational courses.

BACKGROUND

Students (learners) are increasingly engaging in online education activities. Students taking online education courses may do so for various reasons (e.g., professional reasons, lifelong interests in learning, etc.), and invest significant effort into completing coursework (e.g., assignments, exams, etc.) in order to complete a course. An online education course may be provided to students over network connections or the Internet by an education course provider. For example, an online course provider may have access to, or create, course materials or resources for an online education course on a cloud computing platform. The online course provider may serve the course materials to the students as web pages on network or Internet-connected client communication devices.

Entire education courses with structured programs (e.g., including a series of lectures, demonstrations, quizzes and tests, etc.) can be made available online to students from the cloud computing platform. The students may receive the online education course content (e.g., video) on a computing device (e.g., desktop, laptop, tablets, a mobile phone, a smartphone, a radio transceiver, a telephone, a mobile computing device, etc.), which may have a variety of technical capabilities (e.g., internet connections, input/output devices, audio or video capabilities, display size, etc.).

When a large number (e.g., hundreds or thousands or tens of thousands) of students enroll, and participate, in the same online education course, the course may be known as a MOOC. MOOCs include course materials on various media such as text documents, audio, and video that contain the course content. Students follow a protocol for studying the course content in order to master the subject matter of a course. The students evaluate their mastery of the subject matter through tests, homework, and other projects.

SUMMARY

In one general aspect, a method of generating an assessment question about content of an educational course includes obtaining, by processing circuitry of a computer, an electronic document of content of the course and generating a parsable text version of the electronic document. Importance scores for sentences of the parsable text version of the electronic document are generated and a sentence having an importance score that exceeds a first threshold value is identified. A key phrase in the identified sentence is identified, where the identified key phrase has a key phrase score that exceeds a second threshold value, and an assessment question about the content of the course related to the identified sentence is generated, where the assessment question is based on the identified sentence but where the identified key phrase is not present in the assessment question.

In another general aspect, a computer program product includes code that, when executed by processing circuitry of a server, causes the processing circuitry to obtain, by processing circuitry of a computer, an electronic document of content of the course, generate a parsable text version of the electronic document, generate importance scores for sentences of the parsable text version of the electronic document, identify a sentence having an importance score that exceeds a first threshold value, identify a key phrase in the identified sentence, where the identified key phrase has a key phrase score that exceeds a second threshold value, and generate an assessment question about the content of the course related to the identified sentence, where the assessment question is based on the identified sentence but where the identified key phrase is not present in the assessment question.

In another general aspect, an electronic apparatus is configured to provide references to electronic documents to a student of an educational course, where the electronic apparatus includes memory and controlling circuitry coupled to the memory. The controlling circuitry is configured to obtain an electronic document of content of the course, generate a parsable text version of the electronic document, generate importance scores for sentences of the parsable text version of the electronic document, identify a sentence having an importance score that exceeds a first threshold value, identify a key phrase in the identified sentence, where the identified key phrase has a key phrase score that exceeds a second threshold value; and generate an assessment question about the content of the course related to the identified sentence, where the assessment question is based on the identified sentence but where the identified key phrase is not present in the assessment question.

Implementations can include one or more of the following features, alone or in any combination. For example, the assessment question can be presented to a student participating in the course while the student is viewing content of the course. The question can be presented to the student more than a threshold amount of time after the content of the course related to the identified sentence has been presented to the student.

The importance scores can be based, at least in part, on interactions of students with content in the electronic document. The interactions can include pausing a rendering of the electronic document. The interactions can include receipt of a comment on the content of the electronic document.

Identifying the key phrase can include generating key phrase scores for phrases in the identified sentence by performing a machine learning operation on phrases in the identified sentence to produce an embedded semantic model based on the phrases, the semantic embedding model being configured to generate components of a vector in a multi-dimensional space representing a phrase.

The details of one or more implementations are set forth in the accompanying drawings and the description below. Other features will be apparent from the description and drawings, and from the claims.

DETAILED DESCRIPTION

As discussed above, educational courses, including MOOCs, include course materials on various media such as text documents, audio, and video, which contain the course content. Students participating in a course and trying to learn and master the material of the course may want to be tested on their knowledge of the material. Conventional techniques of generating assessment material involve generating that assessment material manually. For example, professors and other developers of the course may generate the assessment materials manually when preparing the materials for the course.

In contrast to the above-described conventional techniques of generating assessment materials for use by students of courses, improved techniques involve automatically generating the assessment materials based on automatic analysis of semantic content material with within a course. Along these lines, the electronic documents containing content of the course can be analyzed automatically to determine importance scores for the sentences of the content, and sentences can be analyzed to determine importance scores of phrases in the sentences. With this information, assessment questions can be automatically generated, where the assessment questions are based on sentences that have a relatively high importance score, and that ask a student to show that they know one or more phrases in the sentences and having a relatively high importance score. In this manner, assessment questions that test a student's knowledge of importance aspects of the course can be automatically generated. The assessment questions may be formatted, and presented to students, in the form of flash cards, in which a relatively important sentence, or a variation on it, is presented to the student with a key phrase missing from the relatively important sentence to test whether the student knows the key phrase that is missing from the sentence.

Figure 1:
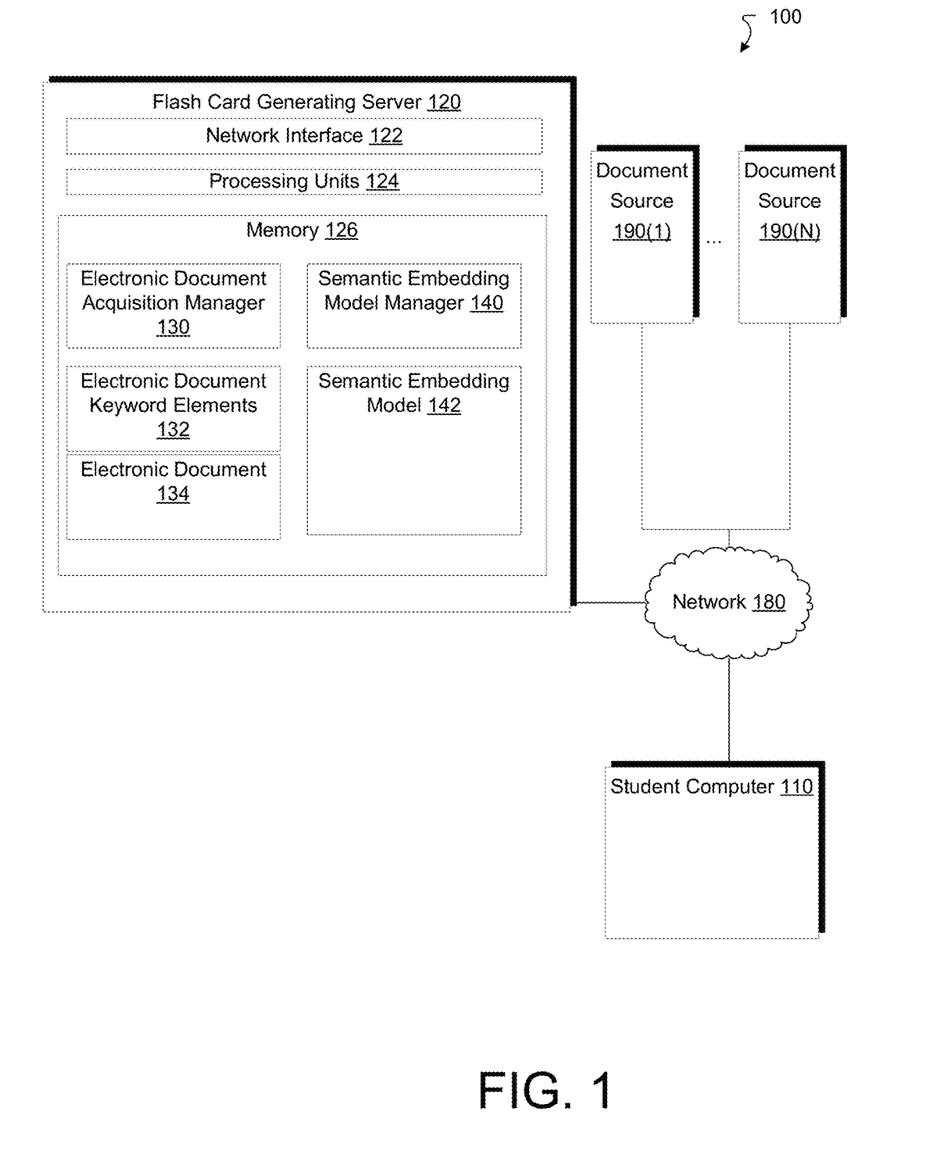
FIG. 1 is a diagram that illustrates an example electronic environment according to an implementation of improved techniques described herein.

FIG. 1 is a diagram that illustrates an example electronic environment 100 in which the above-described improved techniques may be implemented. As shown, in FIG. 1, the example electronic environment 100 includes a student computer 110, a flash card generating server 120, a network 180, and document sources 190(1), . . . , 190(N).

The flash card generating server 120 is configured to generate assessment questions (e.g., in the form of flash cards) that can be presented to a user of the student computer 110. The flash card generating server 120 includes a network interface 122, one or more processing units 124, and memory 126. The network interface 122 includes, for example, Ethernet adaptors, Token Ring adaptors, and the like, for converting electronic and/or optical signals received from the network 180 to electronic form for use by the flash card generating server 120. The set of processing units 124 include one or more processing chips and/or assemblies. The memory 126 includes both volatile memory (e.g., RAM) and non-volatile memory, such as one or more ROMs, disk drives, solid state drives, and the like. The set of processing units 124 and the memory 126 together form control circuitry, which is configured and arranged to carry out various methods and functions as described herein.

In some embodiments, one or more of the components of the flash card generating server 120 can be, or can include processors (e.g., processing units 124) configured to process instructions stored in the memory 126. Examples of such instructions as depicted in FIG. 1 include an electronic document acquisition manager 130, and a semantic embedding model manager 140. Further, as illustrated in FIG. 1, the memory 126 is configured to store various data, which is described with respect to the respective managers that use such data.

The electronic document acquisition manager 130 is configured to acquire electronic documents from the document sources 190(1), . . . , 190(N). The electronic documents that comprise the course (text documents, slides, videos, quizzes, tests, etc.) may be stored on the document sources 190(1), . . . , 190(N) and then transmitted to, received by, the electronic document manager 130. The electronic document acquisition manager 130 is also configured to convert each of the acquired electronic documents 134 into parsable documents that can be analyzed for important sentence and important phrases. For example, an audio electronic document or an audiovideo electronic document 134 of the course can be converted to a parsable document by converting the audio electronic document or the audiovideo electronic document 134 into a text document using speech recognition or speech-to-text techniques.

The semantic embedding model manager 140 is configured to generate a semantic embedding model 142 from the electronic document keyword elements 132 and the electronic document data 134. The semantic embedding model manager 140 can perform a machine learning operation to generate the semantic embedding model 142, where the model is trained to identify important sentences and important keywords in the sentences using both labeled data as well as semantic information gleaned from text itself.

Machine learning is the field of study where a computer or computers learn to perform classes of tasks using the feedback generated from the experience or data that the machine learning process acquires during computer performance of those tasks. Typically, machine learning can be broadly classed as supervised and unsupervised approaches, although there are particular approaches such as reinforcement learning and semi-supervised learning that have special rules, techniques and/or approaches.

Supervised machine learning relates to a computer learning one or more rules or functions to map between example inputs and desired outputs as predetermined by an operator or programmer, usually where a data set containing the inputs is labelled. Supervised machine learning techniques require labeled data points. For example, to train a classifier that classifies semantic content of text, the classifier needs to be trained on a set of correctly classified text (e.g., text in which an operator or programmer indicates which sentences and phrases are considered be important). Typically, these labels are costly to obtain, because they need human expert input, or, in other words, human raters. Unsupervised learning relates to determining a structure for input data, for example, when performing pattern recognition, and typically uses unlabeled data sets. Reinforcement learning relates to enabling a computer or computers to interact with a dynamic environment, for example, when playing a game or driving a vehicle. Various hybrids of these categories are possible, such as "semi-supervised" machine learning, in which a training data set has been labelled only partially.

For unsupervised machine learning, there is a range of possible applications such as, for example, the application of machine learning to semantic analysis of text. Unsupervised machine learning is typically applied to solve problems where an unknown data structure might be present in the input data. As the data is unlabeled, the machine learning process identifies implicit relationships between the data, for example, by deriving a clustering metric based on internally derived information. For example, an unsupervised learning technique can be used to reduce the dimensionality of a data set and to attempt to identify and model relationships between clusters in the data set, and can, for example, generate measures of cluster membership or identify hubs or nodes in or between clusters (for example, using a technique referred to as weighted correlation network analysis, which can be applied to high-dimensional data sets, or using k-means clustering to cluster data by a measure of the Euclidean distance between each datum).

Semi-supervised learning is typically applied to solve problems where there is a partially labelled data set, for example, where only a subset of the data is labelled. Semi-supervised machine learning makes use of externally provided labels and objective functions as well as any implicit data relationships.

When initially configuring a machine learning system, particularly when using a supervised machine learning approach, the machine learning operating can be provided with some training data or a set of training examples, in which each example is typically a pair of an input signal/vector and a desired output value, label (or classification) or signal. The machine learning algorithm analyses the training data and produces a generalized function that can be used with unseen data sets to produce desired output values or signals for the unseen input vectors/signals.

Here, the semantic embedding model manager 140 can perform a machine learning operation to generate the semantic embedding model 142 based on feedback from a human rater. For example, text passages can be provided to the manager 140, and the rater can indicate which sentences of the text are considered to be the important sentences of the text and which phrases (e.g., individual words or groups of words in the text) are considered to be important phrases in the sentences. In addition, the manager 140 can improve the model 142 based on semantic information gleaned from text itself. For example, rules and models of semantic complexity of text, of sentences that represent topic sentences, etc. can be applied by the manager 140 to recognize important sentences and phrases in the text. From the feedback and from the semantic rules, the semantic embedding model 142 can learn to recognize important sentences and phrases in additional texts without using human feedback when a new, previously-unseen text is received. Then, when a new text is received, the manager 140 can determine importance scores for all of the sentences of the text and can determine key phrase scores for phrases in the text. Sentences having an importance score that exceeds a threshold value or the top scoring X % (where X is a number between 0 and 99) of the sentences can be considered as the important sentence for the text. Similarly, phrases having key phrase scores that exceed a threshold value, or the top scoring X % (where X is a number between 0 and 99) of the phrases can be considered as the key phrases for the text.

The network 180 is configured and arranged to provide network connections between the flash card generating server 120, the student computer 110, and the document sources 190(1) . . . 190(N). The network 180 may implement any of a variety of protocols and topologies that are in common use for communication over the Internet or other networks. Further, the network 180 may include various components (e.g., cables, switches/routers, gateways/bridges, etc.) that are used in such communications. The document sources 190(10, . . . , 190(N) are configured to host interfaces that provide access to electronic documents of courses.

In some implementations, the memory 126 can be any type of memory such as a random-access memory, a disk drive memory, flash memory, and/or so forth. In some implementations, the memory 126 can be implemented as more than one memory component (e.g., more than one RAM component or disk drive memory) associated with the components of the flash card generating server 120. In some implementations, the memory 126 can be a database memory. In some implementations, the memory 126 can be, or can include, a non-local memory. For example, the memory 126 can be, or can include, a memory shared by multiple devices (not shown). In some implementations, the memory 126 can be associated with a server device (not shown) within a network and configured to serve the components of the flash card generating server 120.

The components (e.g., modules, processing units 124) of the flash card generating server 120 can be configured to operate based on one or more platforms (e.g., one or more similar or different platforms) that can include one or more types of hardware, software, firmware, operating systems, runtime libraries, and/or so forth. In some implementations, the components of the flash card generating server 120 can be configured to operate within a cluster of devices (e.g., a server farm). In such an implementation, the functionality and processing of the components of the flash card generating server 120 can be distributed to several devices of the cluster of devices.

The components of the flash card generating server 120 can be, or can include, any type of hardware and/or software configured to process attributes. In some implementations, one or more portions of the components shown in the components of the flash card generating server 120 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the flash card generating server 120 can be, or can include, a software module configured for execution by at least one processor (not shown). In some implementations, the functionality of the components can be included in different modules and/or different components than those shown in FIG. 1.

Although not shown, in some implementations, the components of the flash card generating server 120 (or portions thereof) can be configured to operate within, for example, a data center (e.g., a cloud computing environment), a computer system, one or more server/host devices, and/or so forth. In some implementations, the components of the flash card generating server 120 (or portions thereof) can be configured to operate within a network. Thus, the components of the flash card generating server 120 (or portions thereof) can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some embodiments, one or more of the components of the flash card generating server 120 can be, or can include, processors configured to process instructions stored in a memory. For example, the electronic document acquisition manager 130 (and/or a portion thereof) and the semantic embedding model manager 140 (and/or a portion thereof) can be a combination of a processor and a memory configured to execute instructions related to a process to implement one or more functions.

Figure 2:
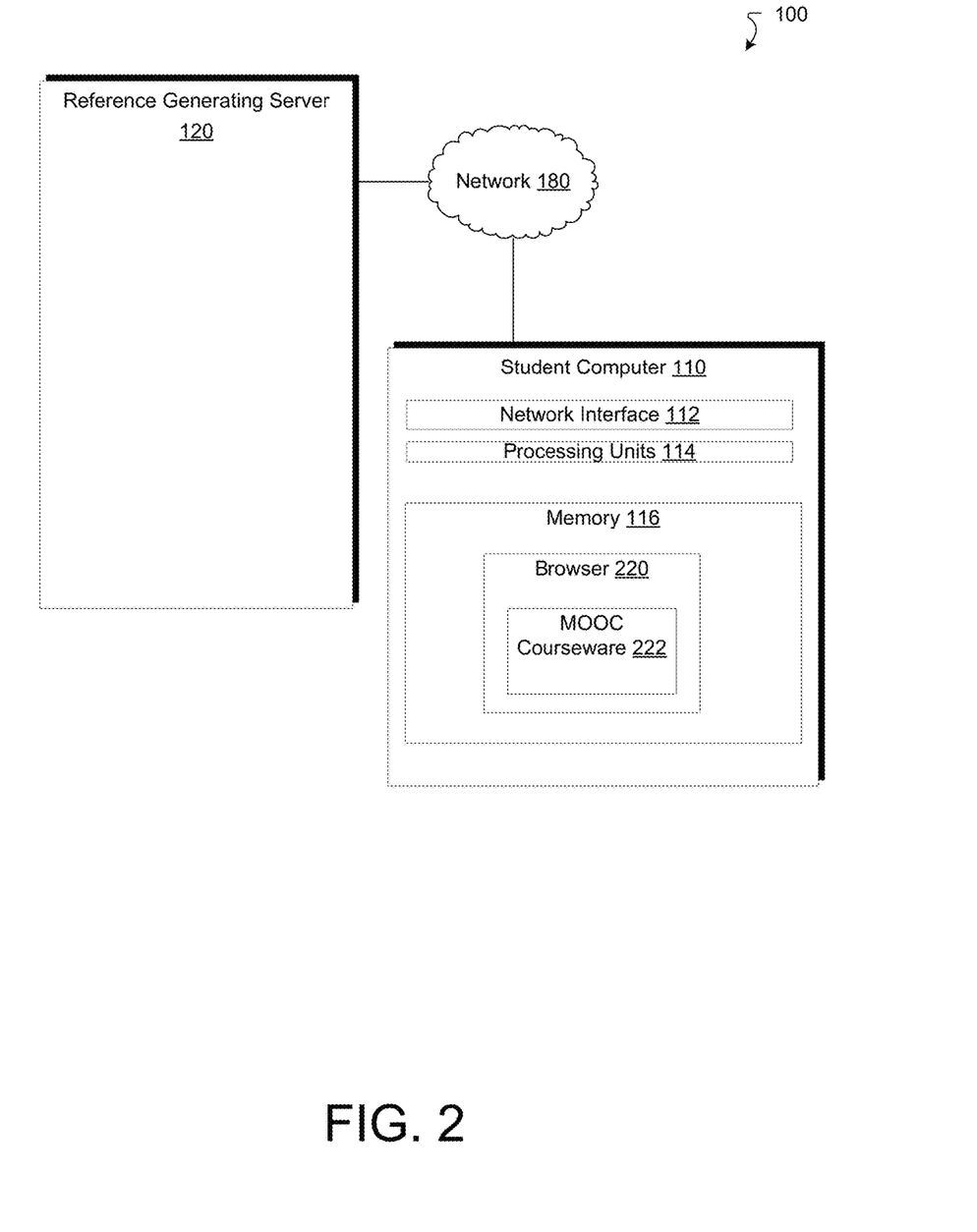
FIG. 2 is a diagram that illustrates another example electronic environment according to an implementation of improved techniques described herein.

FIG. 2 is a diagram that illustrates another example electronic environment 200 in which the above-described improved techniques may be implemented. As shown, in FIG. 2, the example electronic environment 200 includes the student computer 110, the flash card generating server 120, and the network 180.

The student computer 110 is configured to provide a student of a course with interactive tools for experiencing the course content. Such tools may include audio, video, and/or textual lectures, exercises, and exams. The student computer 110 can be also configured to receive signals indicating important sentences in the content of the course, which can be used to generate assessment material about the content. For example, when the student pauses a video file of the course (e.g., a video file in which a professor is talking about content of the course), the sentence (or sentences) near the portion of the video at which the pause occurred can be considered to be relatively important sentences, because the act of pausing may indicate that the student wants to stop and think about the content or wants to backup in video to replay the portion the video. In another example, when the student enters a note, comment, etc. in a user interface at a particular portion of the course, the sentence (or sentences) near the portion of the video at which the entry occurred can be considered to be relatively important sentences, because the student was motivated to comment on the content at or near to the corresponding sentence. The detection of such interactions with the content of the course by students can be especially useful to determining important sentences when the course is MOOC with hundreds or thousands of students.

The student computer 110 also can be configured to present assessment materials to the student to help the student master the material. For example, if the student appears to be struggling in a particular topic, the student computer 110 may present assessment questions to the student based on that topic. Or, regardless of whether the student appears to be struggling with the material, assessment questions can be presented to the student to help the student retain knowledge of the material.

The student computer 110 includes a network interface 122, one or more processing units 124, and memory 116. The network interface 122 includes, for example, Ethernet adaptors, Token Ring adaptors, and the like, for converting electronic and/or optical signals received from the network 180 to electronic form for use by the student computer 110. The set of processing units 124 include one or more processing chips and/or assemblies. The memory 116 includes both volatile memory (e.g., RAM) and non-volatile memory, such as one or more ROMs, disk drives, solid state drives, and the like. The set of processing units 124 and the memory 116 together form control circuitry, which is configured and arranged to carry out various methods and functions as described herein.

In some embodiments, one or more of the components of the student computer 110 can be, or can include processors (e.g., processing units 124) configured to process instructions stored in the memory 116. Examples of such instructions as depicted in FIG. 2 include an Internet browser 220 that is configured to run course courseware 222. Further, as illustrated in FIG. 1, the memory 126 is configured to store various data, which is described with respect to the respective managers that use such data.

The Internet browser 220 may be any browser that is capable of running software for the course. For example, the courseware for a course may be a JavaScript program; in such a case, the Internet browser 220 should be capable of running JavaScript programs.

Figure 3:
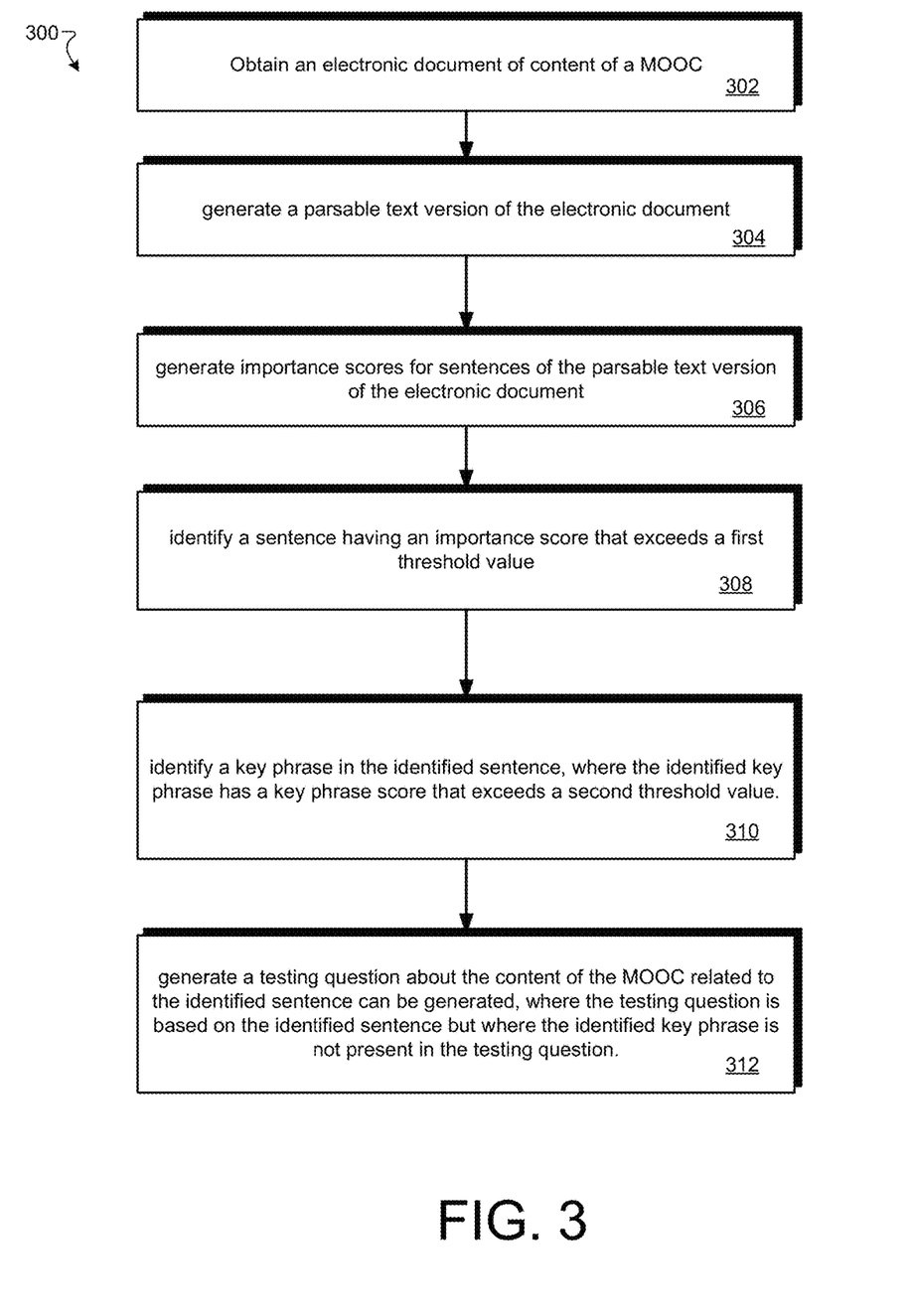
FIG. 3 is a flow chart illustrating an example method according to the improved techniques described herein.

FIG. 3 is a flow chart that illustrates an example method 300 of generating an assessment question about content of a course. The method 300 may be performed by software constructs described in connection with FIG. 1, which reside in memory 126 of the flash card generating server 120 and are run by the set of processing units 124.

At 302, an electronic document 134 containing content of a course is obtained by the electronic document acquisition manager 130. The electronic document 134 can be a file that includes text, an audio file, an audiovisual file, or the like.

At 304, a parsable text version of the electronic document 134 is generated. For example, when the electronic document is an audio file or an audiovisual file, speech recognition techniques can be used on the document 134 to generate the parsable text file. In another example, when the electronic document is a text file, the document 134 can be left in its existing form or can be reformatted in a different text format to generate the parsable text file.

At 306, importance scores for sentences of the parsable text version of the electronic document can be generated. For example, as discussed above, a machine learning operation can be used to determine importance scores for sentences of the parsable text.

At 308, a sentence having an importance score that exceeds a first threshold value is identified. The first threshold value can be an absolute value or can be a relative value (e.g., relative to the values of other importance scores for sentences in the electronic document—for example, the highest X % of the importance scores for sentences can be considered to exceed the threshold). In some implementations, steps 306 and 308 can be performed sequentially. In some implementations, steps 306 and 308 can be performed as part of a single functional operation—i.e., in parallel or simultaneously with each other.

At 310, a key phrase in the identified sentence is identified, where the identified key phrase has a key phrase score that exceeds a second threshold value. The second threshold value can be an absolute value or can be a relative value (e.g., relative to the values of other key phrase scores for phrases in the electronic document—for example, the highest Y % of the importance key phrase scores can be considered to exceed the threshold). In addition, feedback from humans (e.g., students taking a course, professors and preparers of the course, or experts on the course materials) also can be used to determine key phrases. For example, highlighting, underlining, tagging, etc. of text in the course by people can used to determine that the highlighted, underlined, tagged, portions etc. of text are likely to include one or more key phrases. These additional signals can be used to further train the machine learning operation.

At 312, an assessment question about the content of the course related to the identified sentence can be generated, where the assessment question is based on the identified sentence but where the identified key phrase is not present in the assessment question. For example, the assessment question can include, or can be based on, the text of an identified important sentence, but with a key phrase of the sentence removed, such that the student is prompted to show that he or she knows that key phrase is missing from the important sentence.

Figure 4A:
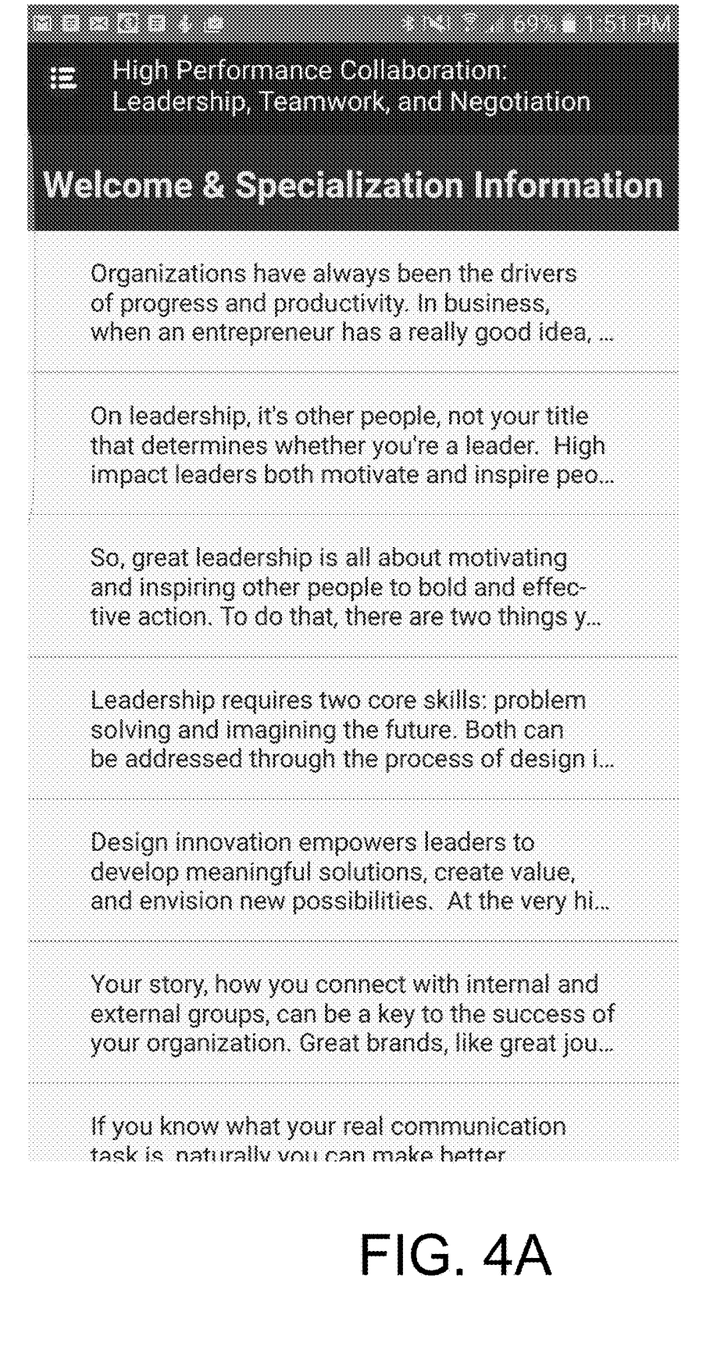
FIGS. 4A, 4B, and 4C are example screenshots of an implementation of improved techniques described herein.

FIG. 4A is a screenshot of example text 402 of a course about High Performance Collaboration: Leadership, Teamwork, and Negotiation. The text may be derived from an audio file of the course through speech recognition techniques or may be provided in a text format in the course electronic documents.

Figure 4B:
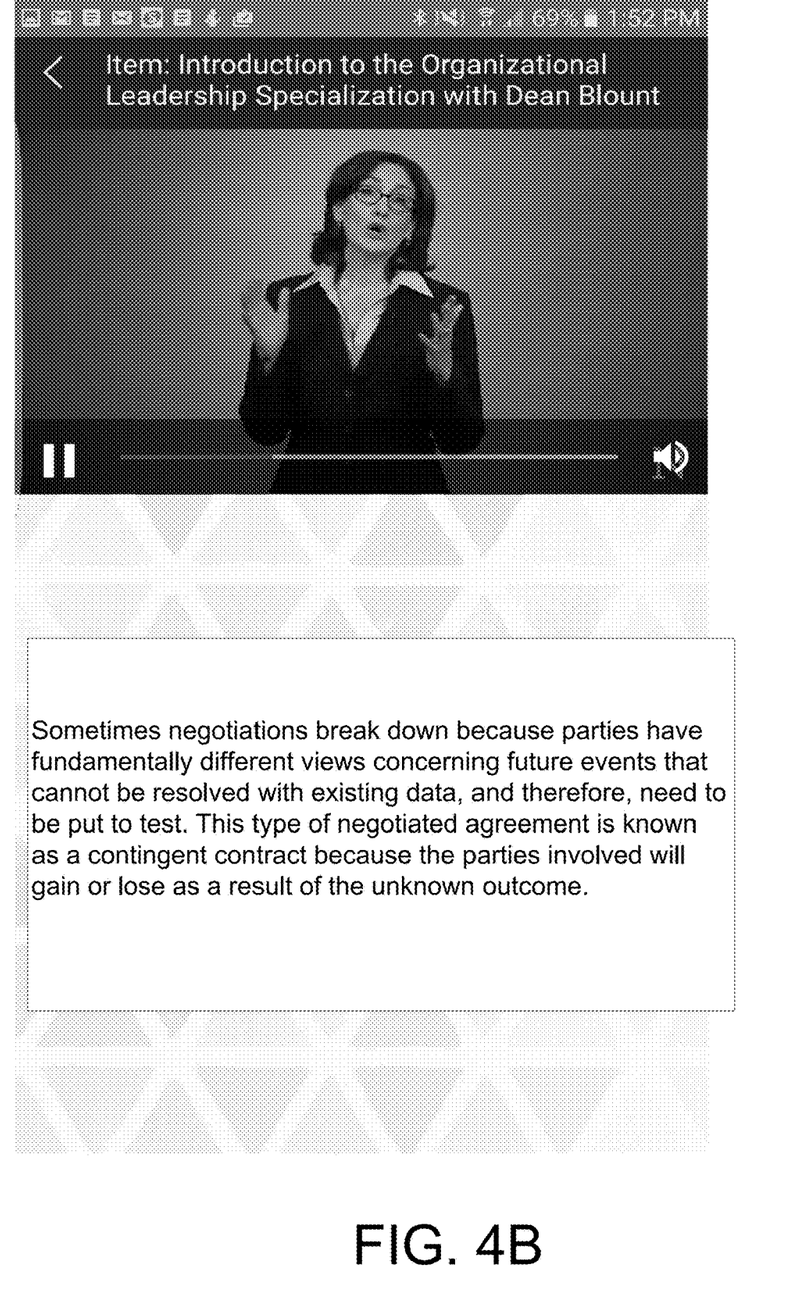

FIG. 4B is a screenshot of an example sentence of the course bout High Performance Collaboration: Leadership, Teamwork, and Negotiation. The sentence may be one that is uttered by a speaker during the rendering of in an audiovisual file of the course and that is converted from the audio format into a text format using speech recognition techniques. The sentence can be identified automatically as an important sentence among all of the sentences of the course using the techniques described above.

Figure 4C:
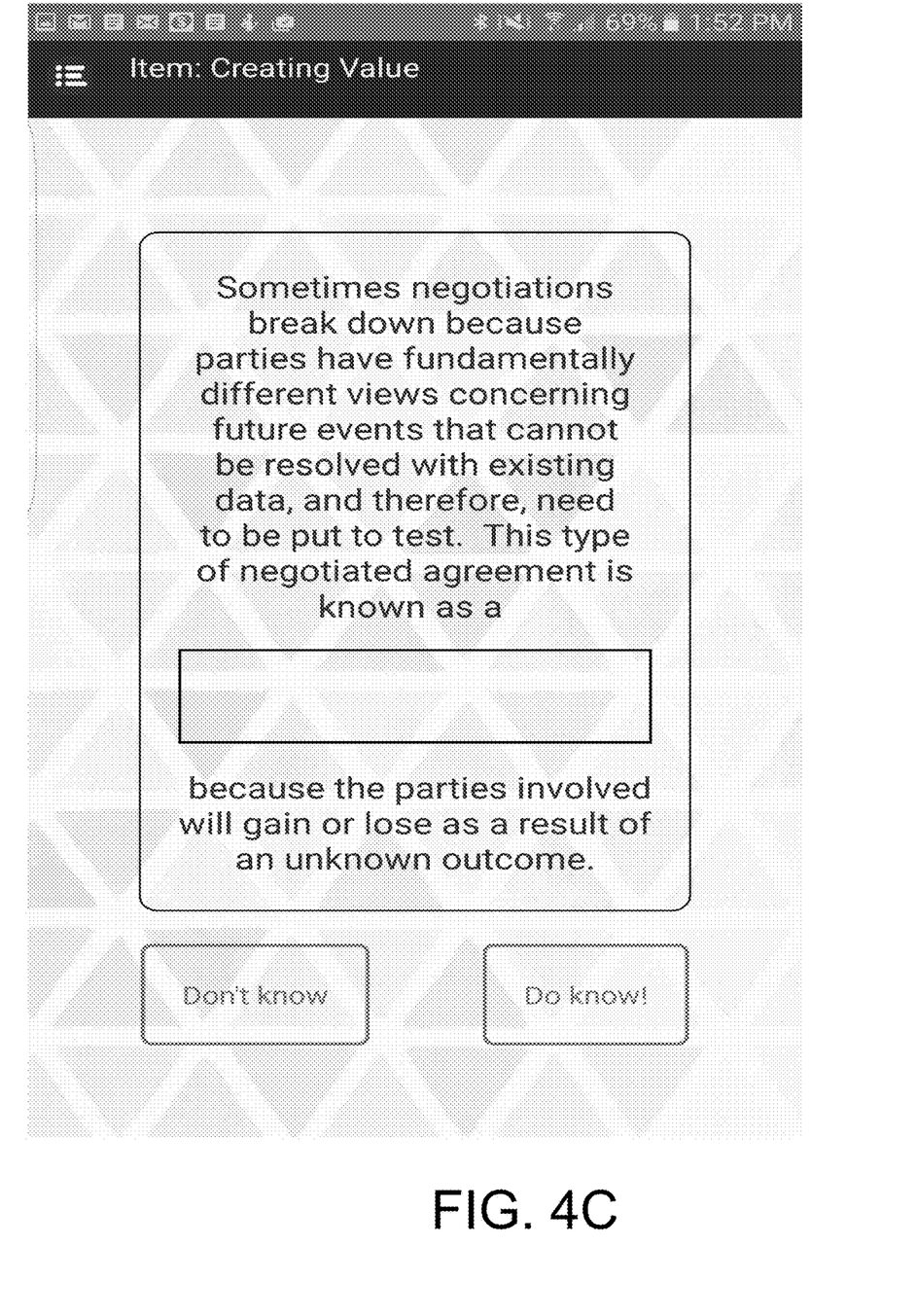

FIG. 4C is a screenshot of an example assessment question about the material of the course about High Performance Collaboration: Leadership, Teamwork, and Negotiation. The assessment question can be based on the identified important sentence shown in FIG. 4B and based on a key phrase of the important sentence. For example, the assessment question can repeat the important sentence but with the key phrase removed from the sentence.

The assessment question can be presented to a student of the course to test the student's knowledge and comprehension of the material of the course. The assessment question can be presented to the student in a variety of formats. For example the assessment question can be presented to the student in a dedicated user interface used to present test questions (e.g., flash cards) to the student after the student has finished viewing the content of the course, after the student has finished viewing the content of a section of the course, or when the student activates a panel to bring up assessment questions. In another example, the assessment question can be presented to the student alongside the user interface in which the content of the material of the course is displayed, while the content of the course is being presented to the student. The assessment question can be presented to the student only after the student has not seen or heard the important sentence from which the assessment question was derived for more than a predetermined period of time. Assessment questions can be presented automatically to test the student's recall of the material of the course, and the rendering of the content of the course can be paused while an assessment question is displayed and an answer is received from the student. The frequency at which assessment questions are displayed can depend on the percentage of correct answers received from the student. "Spaced repetition" is a technique that can be used to determine the frequency, such that it promotes long-term retention of the material by the student.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device (computer-readable medium, a non-transitory computer-readable storage medium, a tangible computer-readable storage medium) or in a propagated signal, for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user ca provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method of generating an assessment question about content of an online educational course delivered over network connections or the Internet from a cloud computing platform to a student's computing device, the method comprising:
   obtaining, by processing circuitry of a computer, an electronic document of content of the course;
   generating a parsable text version of the electronic document;
   generating sentence importance scores for sentences of the parsable text version of the electronic document;
   identifying a sentence having a sentence importance score that exceeds a first threshold value;
   identifying a key phrase in the identified sentence, wherein the identified key phrase has a key phrase importance score that exceeds a second threshold value;
   generating an assessment question about the content of the course related to the identified sentence, wherein the assessment question is based on the identified sentence but wherein the identified key phrase is not present in the assessment question; and
   presenting the assessment question to the student of the education course via a dedicated user interface on the student's computing device.

2. The method as in claim 1, further comprising presenting the assessment question to a student participating in the course while the student is viewing content of the course.

3. The method of claim 2, wherein the question is presented to the student more than a threshold amount of time after the content of the course related to the identified sentence has been presented to the student.

4. The method of claim 1, wherein the importance scores are based, at least in part, on interactions of students with content in the electronic document.

5. The method of claim 4, wherein the interactions include pausing a rendering of the electronic document.

6. The method of claim 4, wherein the interactions include receipt of a comment on the content of the electronic document.

7. The method of claim 1, wherein identifying the key phrase includes generating key phrase importance scores for phrases in the identified sentence by performing a machine learning operation on phrases in the identified sentence to produce an embedded semantic model based on the phrases, the semantic embedding model being configured to generate components of a vector in a multidimensional space representing a phrase.

8. A computer program product comprising a nontransitive storage medium, the computer program product including code that, when executed by processing circuitry of a server, causes the processing circuitry to:
   obtain, by processing circuitry of a computer, an electronic document of content of an online educational course delivered over network connections or the Internet from a cloud computing platform to a student's computing device:
   generate a parsable text version of the electronic document;
   generate sentence importance scores for sentences of the parsable text version of the electronic document;
   identify a sentence having sentence importance score that exceeds a first threshold value;
   identify a key phrase in the identified sentence, wherein the identified key phrase has a key phrase importance score that exceeds a second threshold value;
   generate an assessment question about the content of the course related to the identified sentence, wherein the assessment question is based on the identified sentence but wherein the identified key phrase is not present in the assessment question; and
   present the assessment question to the student of the online education course via a dedicated user interface on the student's computing device.

9. The computer program product as in claim 8, wherein the code, when executed by processing circuitry of a server, further causes the processing circuitry to present the assessment question to a student participating in the course while the student is viewing content of the course.

10. The computer program product as in claim 9, wherein the question is presented to the student more than a threshold amount of time after the content of the course related to the identified sentence has been presented to the student.

11. The computer program product as in claim 8, wherein the importance scores are based, at least in part, on interactions of students with content in the electronic document.

12. The computer program product as in claim 11, wherein the interactions include pausing a rendering of the electronic document.

13. The computer program product as in claim 11, wherein the interactions include receipt of a comment on the content of the electronic document.

14. The computer program product as in claim 8, wherein identifying the key phrase includes generating key phrase importance scores for phrases in the identified sentence by performing a machine learning operation on phrases in the identified sentence to produce an embedded semantic model based on the phrases, the semantic embedding model being configured to generate components of a vector in a multidimensional space representing a phrase.

15. An electronic apparatus configured to provide references to electronic documents to a student of an online educational course delivered over network connections or the Internet from a cloud computing platform to a student's computing device, the electronic apparatus comprising:
   memory; and
   controlling circuitry coupled to the memory, the controlling circuitry being configured to:
      obtain an electronic document of content of the course;
      generate a parsable text version of the electronic document;
      generate sentence importance scores for sentences of the parsable text version of the electronic document;
      identify a sentence having a sentence importance score that exceeds a first threshold value;
      identify a key phrase in the identified sentence, wherein the identified key phrase has a key phrase importance score that exceeds a second threshold value;
      generate an assessment question about the content of the course related to the identified sentence, wherein the assessment question is based on the identified sentence but wherein the identified key phrase is not present in the assessment question; and
      present the assessment question to the student of the online education course via a dedicated user interface on the student's computing device.

16. The electronic apparatus as in claim 15, wherein the controlling circuitry is further configured to present the assessment question to a student participating in the course while the student is viewing content of the course.

17. The electronic apparatus as in claim 16, wherein the question is presented to the student more than a threshold amount of time after the content of the course related to the identified sentence has been presented to the student.

18. The electronic apparatus as in claim 15, wherein the importance scores are based, at least in part, on interactions of students with content in the electronic document.

19. The electronic apparatus as in claim 18, wherein the interactions include pausing a rendering of the electronic document.

20. The electronic apparatus as in claim 18, wherein the interactions include receipt of a comment on the content of the electronic document.

* * * * *